(12) United States Patent
Komoda

(10) Patent No.: US 12,192,265 B2
(45) Date of Patent: Jan. 7, 2025

(54) INFORMATION PROCESSING SYSTEM, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Toshiyuki Komoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 444 days.

(21) Appl. No.: 17/536,093

(22) Filed: Nov. 28, 2021

(65) Prior Publication Data

US 2022/0417318 A1 Dec. 29, 2022

(30) Foreign Application Priority Data

Jun. 24, 2021 (JP) ................................. 2021-105196

(51) Int. Cl.
| | |
|---|---|
| H04L 67/06 | (2022.01) |
| G06F 3/04817 | (2022.01) |
| G06F 16/176 | (2019.01) |
| H04L 67/55 | (2022.01) |

(52) U.S. Cl.
CPC .......... *H04L 67/06* (2013.01); *G06F 3/04817* (2013.01); *G06F 16/176* (2019.01); *H04L 67/55* (2022.05)

(58) Field of Classification Search
None
See application file for complete search history.

(56) References Cited

U.S. PATENT DOCUMENTS

| | | | |
|---|---|---|---|
| 7,058,586 B1 * | 6/2006 | Law ....................... | G06Q 10/02 705/5 |
| 7,734,794 B2 * | 6/2010 | Tohki ................. | H04N 1/32117 358/1.15 |
| 8,954,036 B2 * | 2/2015 | Kojo ..................... | H04L 51/224 455/412.2 |
| 9,232,369 B1 * | 1/2016 | Fujisaki ................ | H04M 3/533 |

FOREIGN PATENT DOCUMENTS

| | | |
|---|---|---|
| JP | 2007094763 | 4/2007 |
| JP | 2007286700 | 11/2007 |

OTHER PUBLICATIONS

Wang et al., "The SIMBA user alert service architecture for dependable alert delivery", Jan. 1, 2001, IEEE, 2001 International Conference on Dependable Systems and Networks (2001, pp. 463-472) (Year: 2001).*

* cited by examiner

*Primary Examiner* — Davoud A Zand
(74) *Attorney, Agent, or Firm* — JCIPRNET

(57) ABSTRACT

An information processing system includes a processor configured to accept, from a sender of a file, a setting of whether or not to notify a recipient that the file has been received, and notify the recipient that the file has been received in a case where there is a reception setting to notify that the file has been received.

14 Claims, 11 Drawing Sheets

INFORMATION PROCESSING SYSTEM, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-105196 filed Jun. 24, 2021.

BACKGROUND

(i) Technical Field

The present invention relates to an information processing system, a non-transitory computer readable medium storing a program, and an information processing method.

(ii) Related Art

JP2007-94763A discloses a process in which a movement source represented by an icon indicated by a pointer and a movement destination represented by an object on a screen that is a drag-and-drop destination to which the icon of the movement source is dragged and dropped are specified.

JP2007-286700A discloses a process in which a hierarchical structure for setting print conditions for printer icons is stored and a lower layer printer icon is displayed in a case where a state in which both icons overlap continues for a predetermined time.

SUMMARY

When a process of notifying a recipient is performed in a case where a file is received, the recipient may be notified that the file has been received.

Here, a sender of this file may want to set whether or not to notify the recipient that the file has been received. For example, in a case of sending a file that a sender wants a recipient to check in a hurry, the sender wants the recipient to know that the file has been received.

Aspects of non-limiting embodiments of the present disclosure relate to an information processing system, a non-transitory computer readable medium storing a program, and an information processing method enabling a sender of a file to perform a setting of whether or not to notify a recipient that the file has been received.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to accept, from a sender of a file, a setting of whether or not to notify a recipient that the file has been received, and notify the recipient that the file has been received in a case where there is a reception setting to notify that the file has been received.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
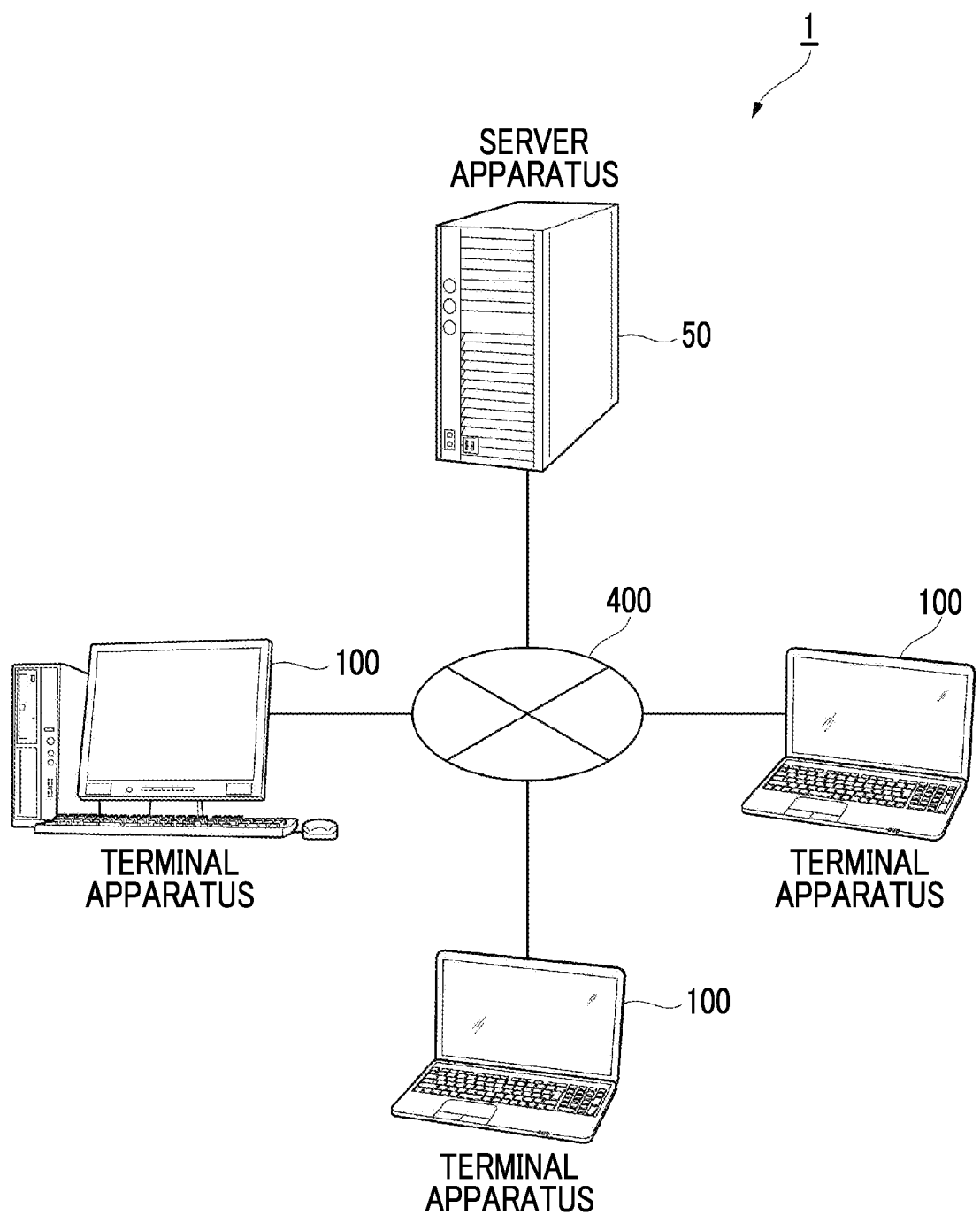
FIG. 1 is a diagram showing a configuration example of an information processing system.

FIG. 1 is a diagram showing a configuration example of an information processing system 1 of the present exemplary embodiment.

The information processing system 1 of the present exemplary embodiment includes a server apparatus 50 and a plurality of terminal apparatuses 100 connected to the server apparatus 50.

The server apparatus 50 is connected to the plurality of terminal apparatuses 100 via a communication line 400 such as an Internet line. Each of the server apparatus 50 and the plurality of terminal apparatuses 100 is configured with a computer device.

Figure 2:
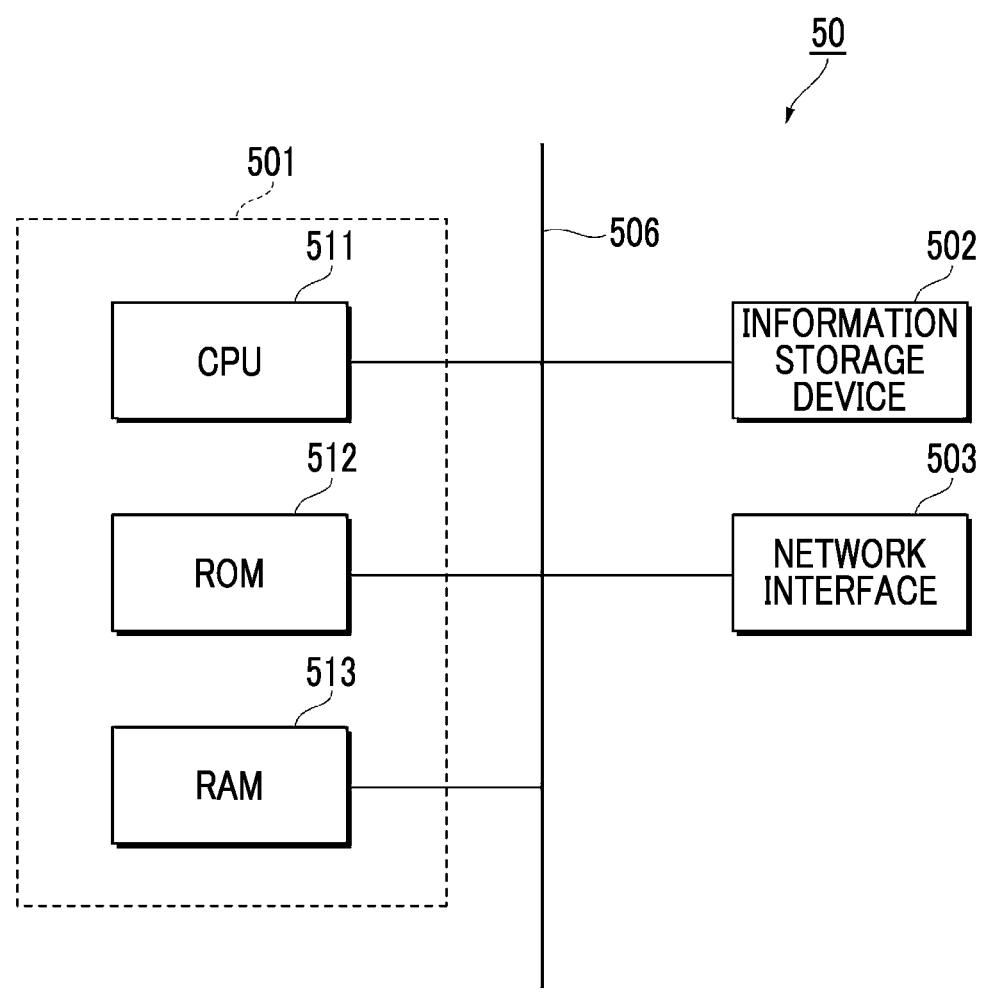
FIG. 2 is a diagram showing an example of a hardware configuration of a server apparatus.

FIG. 2 is a diagram showing an example of a hardware configuration of the server apparatus 50.

The server apparatus 50 as an example of an information processing apparatus has an information processing unit 501, an information storage device 502 that stores information, and a network interface 503 that realizes communication via a local area network (LAN) cable or the like.

The information processing unit 501 has a central processing unit (CPU) 511 as an example of a processor, a read only memory (ROM) 512 in which basic software, a basic input output system (BIOS), and the like are stored, and a random access memory (RAM) 513 that is used as a work area.

The CPU 511 may be multi-cores. The ROM 512 may be a rewritable non-volatile semiconductor memory.

The information storage device 502 is realized by an existing information storage device such as a hard disk drive, a semiconductor memory, and a magnetic tape.

The information processing unit 501, the information storage device 502, and the network interface 503 are connected to each other via a bus 506 or a signal line (not shown).

Here, a program executed by the CPU 511 may be provided to the server apparatus 50 in a state of being stored in a computer-readable recording medium such as a magnetic recording medium (a magnetic tape, a magnetic disk, or the like), an optical recording medium (an optical disk or the like), a magnetooptical recording medium, or a semiconductor memory. The program executed by the CPU 511 may be provided to the server apparatus 50 by using communication means such as the Internet.

The server apparatus 50 may be configured with a plurality of information processing apparatuses or a single information processing apparatus. In a case where the server apparatus 50 is configured with a plurality of information processing apparatuses, the system for processing information is constructed by the plurality of information processing apparatuses. In this case, this system executes a process that will be described later.

Figure 3:
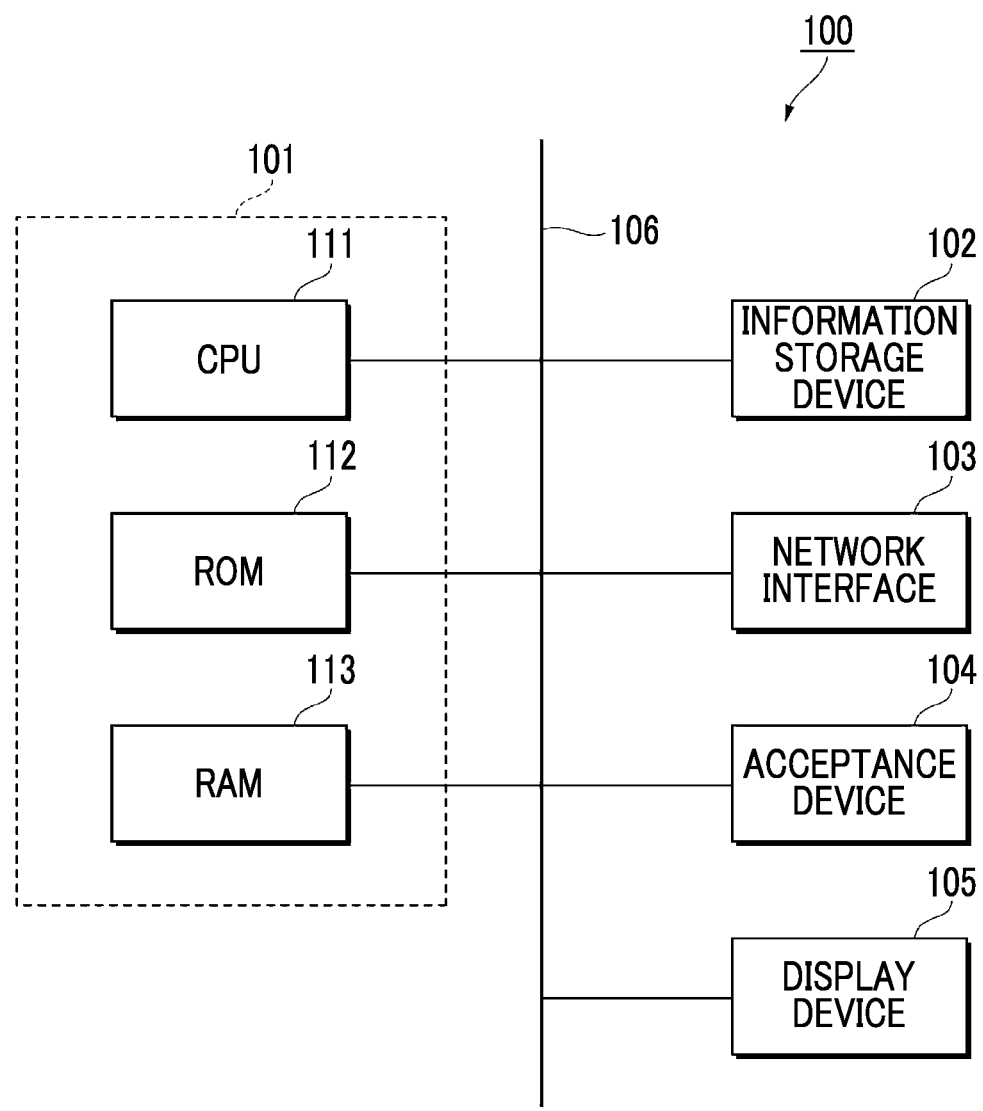
FIG. 3 is a diagram showing an example of a hardware configuration of a terminal apparatus.

FIG. 3 is a diagram showing an example of a hardware configuration of the terminal apparatus 100.

Each terminal apparatus 100 as another example of an information processing apparatus includes an information processing unit 101, an information storage device 102 that stores information, and a network interface 103 that realizes communication via a local area network (LAN) cable or the like.

Each terminal apparatuses 100 includes an acceptance device 104 that accepts an operation of an operator and a display device 105 that displays information.

Examples of the terminal apparatus 100 include a notebook type or desktop type personal computer.

Examples of the terminal apparatus 100 include a portable smartphone and a portable tablet-type terminal apparatus. Examples of the terminal apparatus 100 include a wearable terminal and a game terminal.

The acceptance device 104 is configured with devices such as a keyboard and a mouse, a touch panel, and the like, and in the present exemplary embodiment, the information input by the user to the information processing system 1 is accepted by the acceptance device 104.

The display device 105 is configured with a liquid crystal display, an organic EL display, or the like. Various screens that will be described later are displayed on a display screen of the display device 105.

The information storage device 102 is realized by existing information storage devices such as a hard disk drive, a semiconductor memory, and a magnetic tape.

The information processing unit 101 has a central processing unit (CPU) 111 as an example of a processor, a read only memory (ROM) 112 in which basic software, a basic input output system (BIOS), and the like are stored, and a random access memory (RAM) 113 that is used as a work area.

The CPU 111 may be multi-cores. The ROM 112 may be a rewritable non-volatile semiconductor memory.

The information processing unit 101, the information storage device 102, the network interface 103, the acceptance device 104, and the display device 105 are connected to each other via a bus 106 or a signal line (not shown).

Here, a program executed by the CPU 111 may be provided to the terminal apparatus 100 in a state of being stored in a computer-readable recording medium such as a magnetic recording medium (a magnetic tape, a magnetic disk, or the like), an optical recording medium (an optical disk or the like), a magnetooptical recording medium, or a semiconductor memory.

The program executed by the CPU 111 may be provided to the terminal apparatus 100 by using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

A specific example of the process will be described.

Figure 4:
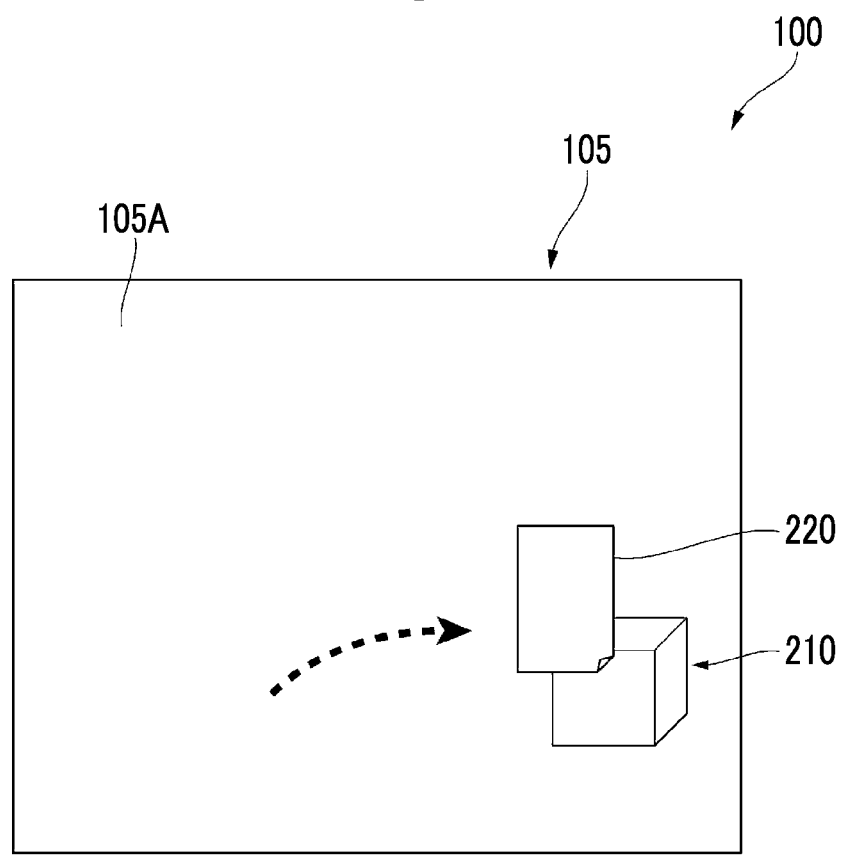
FIG. 4 is a diagram showing an example of a display screen in a display device provided in the terminal apparatus.

FIG. 4 is a diagram showing an example of a display screen 105A in the display device 105 provided in the terminal apparatus 100.

A shared folder 210 shared by a plurality of users is displayed on the display screen 105A of the terminal apparatus 100.

In this processing example, it is assumed that one user who operates one terminal apparatus 100 requests another user to perform work on a document file 220 that is an example of a file via a shared folder 210.

In other words, in this processing example, it is assumed that one user requests another user to perform work on a document included in the document file 220 via the shared folder 210.

In the present exemplary embodiment, the document file 220 will be described as an example of a file, but the file is not limited to the document file 220. Other files include image files, video files, audio files, and the like.

In the present specification, the "file" refers to a group of data that is the unit when handling the data on a computer.

In a case where one user requests another user to perform work on the document file 220, this one user who is a request source of the work operates his/her own terminal apparatus 100 and stores the document file 220 that is a request target in the shared folder 210.

In a case where the document file 220 is stored in the shared folder 210, the user drags the document file 220 on the display screen 105A as shown in FIG. 4. As shown in FIG. 4, this user moves the dragged document file 220 to the shared folder 210. The user then drops the document file 220 into the shared folder 210.

In other words, in a case where the document file 220 is stored in the shared folder 210, the user selects the document file 220 on the display screen 105A and then moves the document file 220 to the display location of the shared folder 210. The user then deselects the document file 220.

In the present exemplary embodiment, a case where a request for work on the document file 220 is made to another user will be described as an example.

However, the process of the present exemplary embodiment is not limited to this, and may be applied to other forms of processes such as a process of simply passing a file such as the document file 220 to another user.

The process of the present exemplary embodiment is applied to a process of sharing a file present in one terminal apparatus 100 with a plurality of users including another user who operates another terminal apparatus 100.

In the present exemplary embodiment, in a case where the user who is a sender of the document file 220 moves the document file 220 to the shared folder 210, the document file 220 is transmitted from the terminal apparatus 100 to the server apparatus 50 (refer to FIG. 1).

The document file 220 is stored in the information storage device 502 (refer to FIG. 2) as an example of a file storage unit provided in the server apparatus 50.

Consequently, another user may perform work on the document file 220 stored in the information storage device 502 of the server apparatus 50 by accessing the server apparatus 50 from his/her terminal apparatus 100.

In the present exemplary embodiment, a predefined start operation is performed on the terminal apparatus 100 by the user who is a request source of the work. Consequently, the terminal apparatus 100 starts to transmit the document file 220 to the server apparatus 50, and the information storage device 502 of the server apparatus 50 starts to store the document file 220.

In the present exemplary embodiment, the operation of moving the document file 220 displayed on the display screen 105A of the terminal apparatus 100 to the shared folder 210 displayed on the display screen 105A is the start operation.

In the present exemplary embodiment, in a case where the user performs this start operation, the transmission of the document file 220 from the terminal apparatus 100 to the server apparatus 50 is started, and the document file 220 is stored in the information storage device 502 of the server apparatus 50.

In the present exemplary embodiment, even in a case where the start operation is performed, the process of transmitting the document file 220 to the server apparatus 50 is not immediately performed. Even in a case where there is the start operation, this transmission is suspended for a predefined time such as a few seconds.

In other words, in the present exemplary embodiment, the process of storing the document file 220 in the information storage device 502 of the server apparatus 50 is interrupted until a predefined time elapses after the start operation is performed by the user.

An example of the "start operation" is, as described above, the operation of moving the document file 220 to the location where the shared folder 210 is displayed on the display screen 105A on which the document file 220 (refer to FIG. 4) is displayed.

In other words, an example of the "start operation" is an operation of moving the document file 220 to a specific region on the display screen 105A on which the document file 220 is displayed.

The "start operation" is not limited to this. For example, the user's selection operation for a menu displayed through right-clicking may be the start operation.

In this case, for example, the menu displayed through right-clicking displays a selection item for giving an instruction for starting storage of the document file 220 in the information storage device 502. In a case where the user selects this selection item, the process of storing the document file 220 in the information storage device 502 is started.

In the present exemplary embodiment, even in a case where the user selects this selection item displayed through right-clicking, the process of transmitting the document file 220 to the server apparatus 50 is not immediately performed, and this transmission process is interrupted for a predefined time such as several seconds.

Figure 5:
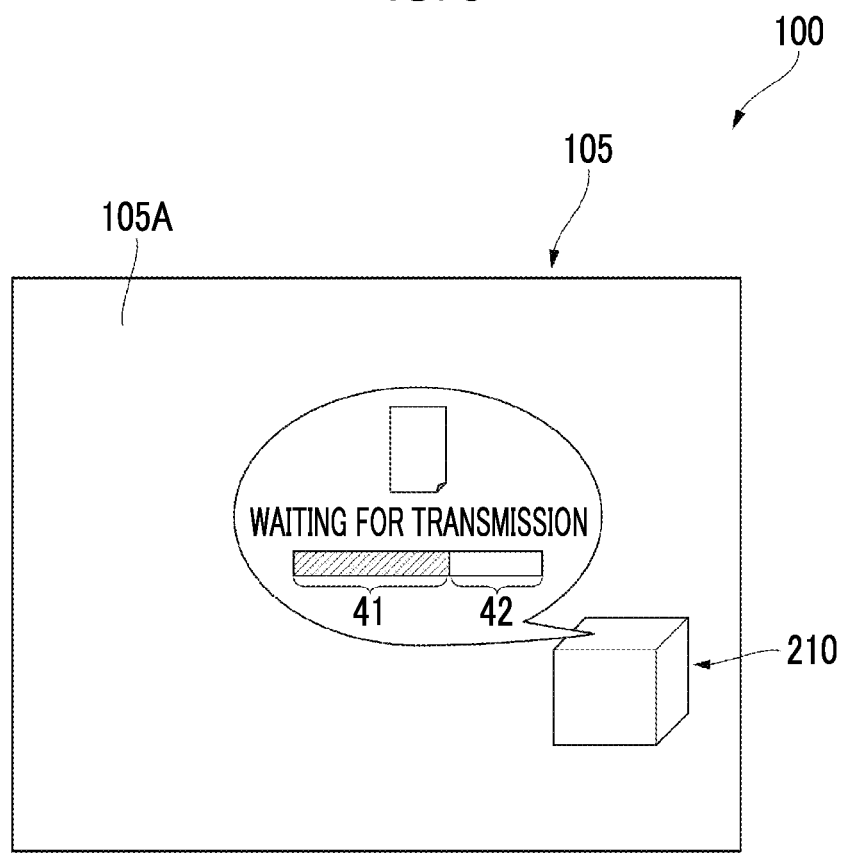
FIG. 5 is a diagram showing a display example in the terminal apparatus.

In the present exemplary embodiment, in a case where the transmission process is interrupted, an image indicating that the transmission process is interrupted is displayed on the display screen 105A of the terminal apparatus 100 as shown in FIG. 5 (a diagram showing a display example in the terminal apparatus 100).

In other words, in the present exemplary embodiment, as shown in FIG. 5, information indicating that the process of transmitting the document file 220 is temporarily suspended until a predefined time elapses from the start operation is displayed on the display screen 105A of the terminal apparatus 100.

In this display example shown in FIG. 5, text information "waiting for transmission" is displayed as the information indicating that the transmission process is interrupted.

In this display example shown in FIG. 5, information regarding an elapsed time from the start operation by the user and a remaining time until the transmission process is resumed are displayed.

Specifically, in this display example, images 41 and 42 that extend laterally and expand or contract with the passage of time are displayed as the information regarding the elapsed time and the remaining time. In the present exemplary embodiment, the elapsed time and the remaining time can be known from lengths of the images 41 and 42 extending in the lateral direction.

The present exemplary embodiment is not limited to this, and specific numerical values may be displayed as the information regarding the elapsed time and the remaining time.

In the present exemplary embodiment, in a case where the document file 220 is stored in the information storage device 502 of the server apparatus 50, stored information that is information indicating that the document file 220 is stored in the information storage device 502 is reported to a predefined specific person.

In other words, in the present exemplary embodiment, in a case where the document file 220 is stored in the shared folder 210, the stored information that is information indicating that the document file 220 is stored in the shared folder 210 is reported to a predefined specific person.

In the present exemplary embodiment, the user may perform a setting of whether or not to notify a predefined specific person of the stored information.

In the present exemplary embodiment, after the user performs the start operation, a setting of whether or not to notify a specific person of the stored information is accepted from the user.

In other words, in the present exemplary embodiment, a setting of whether or not to notify a specific person of the stored information that is the information indicating that the document file 220 is stored in the information storage device 502 is accepted from the user.

Figure 6:
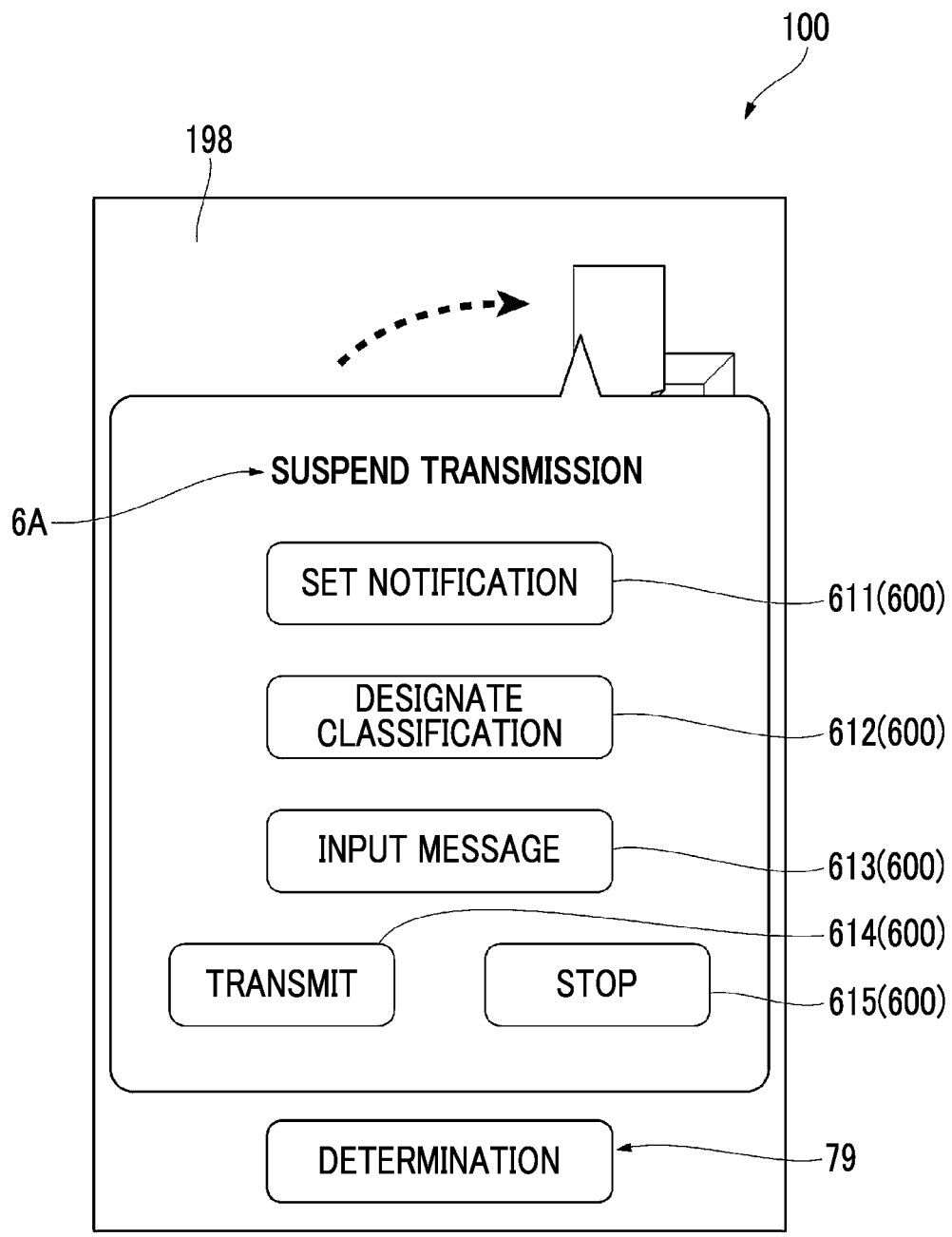
FIG. 6 is a diagram showing a display example in the terminal apparatus.

In the present exemplary embodiment, in a case where the user sets whether or not to notify a specific person of the stored information, as shown in FIG. 6 (a diagram showing a display example in the terminal apparatus 100), an acceptance screen 198 that is a screen for receiving the setting is displayed on the terminal apparatus 100.

More specifically, in the present exemplary embodiment, in a case where the user performs the above start operation, the acceptance screen 198 that is a screen for receiving the setting is displayed on the terminal apparatus 100 of the user.

In the present exemplary embodiment, after the operation of moving the document file 220 to a specific region is performed, the acceptance screen 198 is displayed, and the setting of whether or not to perform a notification is accepted from a sender of the document file 220.

More specifically, in the present exemplary embodiment, in a case where the user performs the start operation that is an operation of moving the document file 220 to a specific region, and this user taps the shared folder 210 (refer to FIG. 4), the acceptance screen 198 shown in FIG. 6 is displayed.

More specifically, in the present exemplary embodiment, in a case where the user taps the shared folder 210 within a predefined time after the user performs the start operation that is an operation of moving the document file 220 to a specific region, the acceptance screen 198 is displayed.

In other words, in the present exemplary embodiment, after the user performs the start operation, the acceptance screen 198 is displayed in a case where the user further taps the shared folder 210 that is an example of a specific operation.

In other words, in the present exemplary embodiment, after the operation of moving the document file 220 to a specific region is performed by the sender of the document file 220, the stored operation is performed in a case where the sender further performs a "reception operation", a process of accepting the setting of whether or not to report the stored information from this sender is performed.

Here, the "reception operation" refers to an operation for starting a process of accepting, from the user who is a sender, a setting of whether or not the server apparatus 50 notifies a predefined recipient that the document file 220 has been received.

In the present exemplary embodiment, the operation of tapping the shared folder 210 corresponds to the reception operation.

In the present exemplary embodiment, the user taps the shared folder 210, and further selects a first selection item 611 (that will be described later) for performing "set notification" as described later.

In a case where the user performs such an operation, a process of accepting, from the user who is a sender, a setting of whether or not the server apparatus 50 notifies a predefined recipient that the document file 220 has been received is performed.

In the present exemplary embodiment, the user performs an operation on the acceptance screen 198 shown in FIG. 6. In response to this, in the present exemplary embodiment, the CPU 111 (refer to FIG. 3) of the terminal apparatus 100 accepts the setting of whether or not to report the stored information from the user.

More specifically, in the present exemplary embodiment, in a case where the user taps the shared folder 210 within a predefined time after the user performs the start operation, a process of accepting a setting of whether or not to report the stored information is performed.

In other words, in the present exemplary embodiment, in a case where the user further performs a specific operation such as tapping the shared folder 210 within a predefined time after the user performs the start operation, the process of accepting the setting of whether or not to report the stored information is performed.

In other words, in the present exemplary embodiment, in a case where the sender performs the above reception operation within a predefined time after the operation of moving the document file 220 to a specific region is performed by the sender, the process of accepting the setting of whether or not to report the stored information is performed from the user is performed.

The present exemplary embodiment is not limited to this, and in a case where the user performs the start operation, the acceptance screen 198 may be displayed even though the above specific operation is not performed. In other words, in a case where the user performs the start operation, the setting of whether or not to report the stored information may be accepted from the user even though the above specific operation is not performed.

In the present exemplary embodiment, after the user performs an operation on the acceptance screen 198 shown in FIG. 6, the process of transmitting the document file 220 to the server apparatus 50 is resumed. In other words, the process of storing the document file 220 in the information storage device 502 is resumed.

More specifically, in the present exemplary embodiment, in a case where the user operates the acceptance screen 198 shown in FIG. 6 and selects a determination button 79 displayed at the bottom of the acceptance screen 198, the process of transmitting the document file 220 to the server apparatus 50 is resumed.

In the present exemplary embodiment, the transmission process is continuously interrupted until the user performs an operation on the acceptance screen 198. In a case where the user performs an operation on the acceptance screen 198, the transmission process is resumed.

In the present exemplary embodiment, even in a case where the user drops the document file 220 into the shared folder 210, the transmission process is not performed immediately, and the transmission process is temporarily interrupted.

In other words, in the present exemplary embodiment, the process of storing the document file 220 in the information storage device 502 that is an example of a file storage unit is interrupted until a predefined time elapses after the sender performs the operation of moving the document file 220 to a specific region.

In the present exemplary embodiment, in a case where the user taps the shared folder 210 within a predefined time after the user drops the document file 220 into the shared folder 210, the transmission process is continuously interrupted until the user performs an operation on the acceptance screen 198.

The user performs an operation on the acceptance screen 198 and performs a setting for the document file 220 while the transmission process for the document file 220 is interrupted.

In the present exemplary embodiment, in a case where the user taps the shared folder 210 within a predefined time after the user performs the start operation, the transmission process is continuously interrupted.

In a case where the transmission process is interrupted, the user performs an operation on the acceptance screen 198 and performs a setting for the document file 220.

In the present exemplary embodiment, the user performs the setting for the document file 220 after the start operation is performed and before the document file 220 is transmitted to the server apparatus 50.

In a case where the user drops the document file 220 into the shared folder 210 (refer to FIG. 4), the information of the shared folder 210 may be displayed.

In other words, in a case where the user performs the start operation of moving the document file 220 to the shared folder 210, information regarding the shared folder 210 may be displayed.

Specifically, for example, in a case where at least a part of the document file 220 to be moved to the shared folder 210 overlaps the shared folder 210, the information regarding the shared folder 210 may be displayed.

Here, the information regarding the shared folder 210 displayed may be, for example, the name of the shared folder 210, an available capacity of the shared folder 210, or the last update date and time of the shared folder 210.

In the present exemplary embodiment, in a case where the user does not tap the shared folder 210 within the predefined time, the acceptance screen 198 (refer to FIG. 6) is not displayed.

In a case where the user does not tap the shared folder 210 within the predefined time and this predefined time elapses, the transmission of the document file 220 from the terminal apparatus 100 to the server apparatus 50 is resumed.

In other words, in a case where the user does not perform tapping that is an example of a specific operation within a predefined time after the user performs the start operation, the process of storing the document file 220 in the information storage device 502 is resumed.

In other words, in the present exemplary embodiment, in a case where the user who is a sender does not perform the reception operation within the above predefined time, the process of storing the document file 220 in the information storage device 502 that is an example of a file storage unit is resumed.

In a case where the process of storing the document file 220 in the information storage device 502 is performed, first, the CPU 111 of the terminal apparatus 100 performs a process of transmitting the document file 220 to the server apparatus 50.

Next, the CPU 511 (refer to FIG. 2) of the server apparatus 50 performs a process of receiving the document file 220. The CPU 511 of the server apparatus 50 performs a process of storing the received document file 220 in the information storage device 502.

Although not shown, in the present exemplary embodiment, during the transmission process for the document file 220 from the terminal apparatus 100 to the server apparatus 50 or after the transmission process is completed, display indicating a transmission status is performed on the display screen 105A of the terminal apparatus 100.

In other words, in the present exemplary embodiment, during the storage process for the document file 220 in the information storage device 502 of the server apparatus 50, or after the storage process is completed, display indicating a storage status is performed on the display screen 105A of the terminal apparatus 100.

Specifically, display indicating a transmission status such as display indicating that the document file 220 is being transmitted or display indicating that the transmission is completed is performed, for example, next to the shared folder 210 (refer to FIG. 5).

In other words, display indicating a storage status such as display indicating that the storage process for the document file 220 is being performed or display indicating that the storage process for the document file 220 is completed is performed, for example, next to the shared folder 210.

The acceptance screen 198 will be described with reference to FIG. 6.

In the present exemplary embodiment, as described above, in a case where the user taps the shared folder 210 within a predefined time after the user performs the start operation, the acceptance screen 198 shown in FIG. 6 is displayed on the terminal apparatus 100 of the user.

A plurality of selection items 600 selected by the user are displayed on the acceptance screen 198.

As indicated by the reference numeral 6A, information indicating that the transmission is interrupted is displayed on the acceptance screen 198.

The determination button 79 is displayed on the acceptance screen 198.

In the present exemplary embodiment, the user selects the selection item 600, performs various settings, and then selects the determination button 79. Consequently, the settings performed by the user are confirmed.

As the selection items 600, a first selection item 611 for setting a notification, a second selection item 612 for specifying a classification, and a third selection item 613 for inputting a message are displayed on the acceptance screen 198.

As the selection items 600, a fourth selection item 614 for giving an instruction for starting a transmission process and a fifth selection item 615 for giving an instruction for stopping the transmission process are displayed on the acceptance screen 198.

Figure 7:
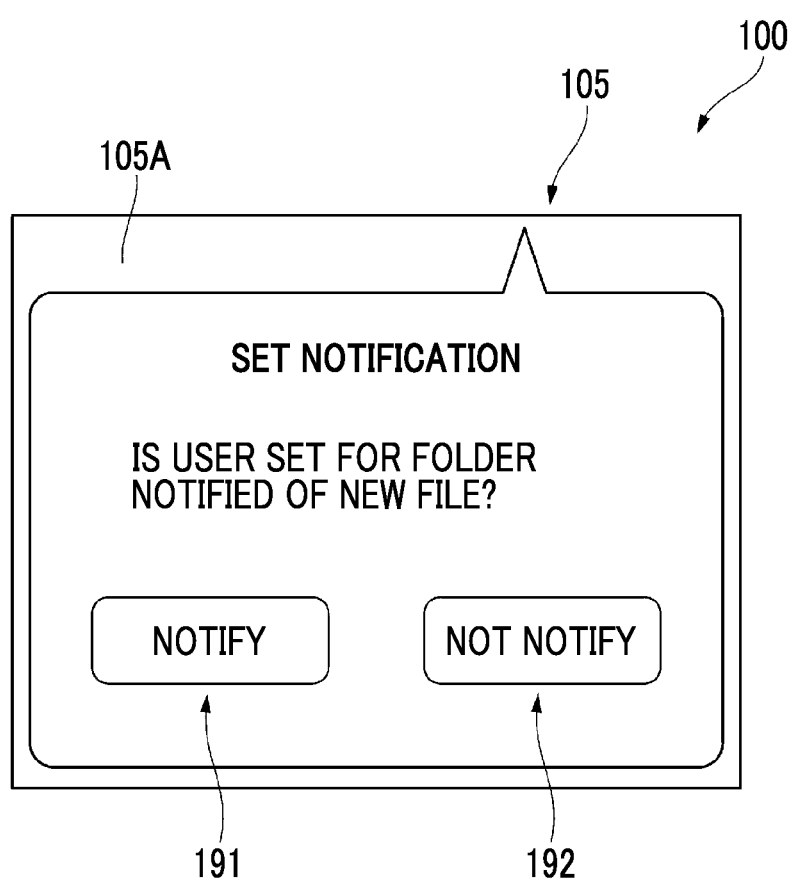
FIG. 7 is a diagram showing a display screen of the terminal apparatus after a first selection item is selected by a user.

FIG. 7 is a diagram showing the display screen 105A of the terminal apparatus 100 after the first selection item 611 for setting a notification is selected by the user.

Two selection items such as a permission selection item 191 for giving an instruction for a permission of a notification of the stored information and a non-permission selection item 192 for giving an instruction for not reporting the stored information are displayed on the display screen 105A shown in FIG. 7.

Although not shown, a back button that is a button for returning to the acceptance screen 198 (refer to FIG. 6) is displayed on the display screen 105A shown in FIG. 7.

In the present exemplary embodiment, the user who has selected the first selection item 611 performs an operation on the display screen 105A shown in FIG. 7 and performs a setting of whether or not to notify another user who is a recipient of the document file 220 of the stored information.

In other words, in the present exemplary embodiment, the user who has selected the first selection item 611 performs an operation on the display screen 105A shown in FIG. 7, and performs a setting of whether or not to notify another user who is an example of a recipient that the server apparatus 50 has received the document file 220.

In other words, in the present exemplary embodiment, the sender of the document file 220 performs an operation on the display screen 105A shown in FIG. 7 and performs a setting of whether or not to notify another user of information indicating that the server apparatus 50 has received the document file 220.

In the present exemplary embodiment, in a case where this setting is performed, information regarding details of the setting are transmitted to the server apparatus 50 (refer to FIG. 1). The CPU 511 of the server apparatus 50 accepts the information regarding the details of the setting.

In other words, the CPU 511 of the server apparatus 50 accepts the information regarding the details of the setting performed by the sender of the document file 220.

In other words, the CPU 511 of the server apparatus accepts the setting of whether or not to notify a recipient that the server apparatus 50 has received the document file 220, the setting having been performed by the sender of the document file 220.

In the present exemplary embodiment, as will be described later, in a case where a reception setting that is the setting for reporting that the server apparatus 50 has received the document file 220 has been performed, the CPU 511 of the server apparatus 50 notifies another user who is a recipient that the document file 220 has been received.

On the other hand, in a case where the reception setting that is the setting for reporting that the server apparatus 50 has received the document file 220 has not been performed, the CPU 511 of the server apparatus 50 does not notify another user who is a recipient that the document file 220 has been received.

In the present exemplary embodiment, a notification destination of the stored information is correlated with the shared folder 210 in advance. Specifically, in the present exemplary embodiment, a transmission destination of the stored information is registered in the information storage device 502 of the server apparatus 50. In other words, in the present exemplary embodiment, the transmission destination of the stored information to be transmitted in a case where the document file 220 is stored in the information storage device 502 is registered in the information storage device 502 of the server apparatus 50.

In other words, in the present exemplary embodiment, the notification destination in a case where the server apparatus 50 notifies that the document file 220 has been received is registered in the information storage device 502.

In other words, in the present exemplary embodiment, the shared folder 210 and the notification destination previously correlated with the shared folder 210 are registered in the information storage device 502 of the server apparatus 50 in a state of being correlated with each other.

In a case where a notification of the stored information is permitted by the user who is a sender, when the document file 220 is stored in the shared folder 210, the stored information is reported to the notification destination correlated with the shared folder 210.

In a case where the user performs an operation on the display screen 105A shown in FIG. 7, selects the permission selection item 191 for giving an instruction for a permission of a notification, and selects the determination button 79 (refer to FIG. 6), permission information that is information indicating that a notification is permitted is transmitted from the terminal apparatus 100 to the server apparatus 50.

In a case where the permission information is transmitted to the server apparatus 50, the stored information is transmitted from the server apparatus 50 to the predefined notification destination.

Specifically, in a case where the document file 220 is stored in the information storage device 502 of the server apparatus 50, the stored information is transmitted from the server apparatus 50 to the predefined notification destination.

In other words, the server apparatus 50 notifies the predefined notification destination that the server apparatus 50 has received the document file 220.

In transmitting the stored information to the notification destination, for example, an e-mail for notifying that there is a new document in the shared folder 210 is transmitted to the notification destination.

In other words, the stored information indicating that the document file 220 is stored in the shared folder 210 is transmitted to the user correlated with the shared folder 210.

In other words, the user correlated with the shared folder 210 is notified that the server apparatus 50 has received the document file 220.

There may be a plurality of users correlated with the shared folder 210, and in this case, the stored information is transmitted to each of the plurality of users.

In the present exemplary embodiment, the CPU 111 of the terminal apparatus 100 accepts, from the user, a setting of whether or not to notify a specific person of the stored information for each document file 220.

In other words, in the present exemplary embodiment, the CPU 111 of the terminal apparatus 100 accepts a setting of whether or not to notify that the server apparatus 50 has received the document file 220 for each document file 220.

In the present exemplary embodiment, the CPU 111 of the terminal apparatus 100 displays the acceptance screen 198 shown in FIG. 6 each time the document file 220 is moved to the shared folder 210 and the shared folder 210 is tapped.

The CPU 111 of the terminal apparatus 100 accepts, from the user, a setting of whether or not to notify a specific person of the stored information in a case where the first selection item 611 is selected by the user.

In other words, in a case where the first selection item 611 is selected by the user, the CPU 111 of the terminal apparatus 100 accepts, from the user, a setting of whether or not to notify a recipient that the server apparatus 50 has received the document file 220.

In the present exemplary embodiment, a setting of whether or not to notify a specific person of the stored information is accepted from the user on the condition that the document file 220 is moved to the shared folder 210 and the shared folder 210 is tapped.

The present exemplary embodiment is not limited to this, and in a case where the document file 220 is moved to the shared folder 210, the acceptance screen 198 shown in FIG. 6 may be displayed.

In other words, the acceptance screen 198 may be displayed only on the condition that the document file 220 is moved to the shared folder 210 without the condition that tapping of the shared folder 210 is performed.

In other words, the setting of whether or not to notify a specific person of the stored information may be accepted from the user even in a case where there is no operation such as tapping the shared folder 210.

In a case where the setting of whether or not to notify a specific person of the stored information is accepted from the user, the CPU 111 of the terminal apparatus 100 correlates information (setting information) regarding this setting with the document files 220 that is a target of the setting.

The CPU 111 of the terminal apparatus 100 transmits the document file 220 and the setting information in a state of being correlated with each other to the server apparatus 50.

The CPU 511 of the server apparatus 50 receives and acquires the document file 220 and the setting information in a state of being correlated with each other.

Next, the CPU 511 of the server apparatus 50 stores the acquired document file 220 in the information storage device 502.

In a case where the acquired setting information indicates a setting to notify a specific person of the stored information, the CPU 511 of the server apparatus 50 performs a process of notifying the specific person of the stored information.

In other words, in a case the acquired setting information indicates a setting to notify another user who is a recipient that the document file 220 has been received by the server apparatus 50, the CPU 511 of the server apparatus 50 performs a process of notifying another person of the stored information.

Specifically, as described above, the CPU 511 of the server apparatus 50 performs, for example, a process of transmitting an e-mail for notifying another user that there is a new document in the shared folder 210.

In the present exemplary embodiment, as described above, it is possible to set whether or not to notify a specific person of the stored information.

In a case where there is a setting to notify a specific person of the stored information, the CPU 511 of the server apparatus 50 performs a process of notifying the specific person of the stored information.

On the other hand, in a case where there is no setting to notify a specific person of the stored information, the CPU 511 of the server apparatus 50 does not perform the process of notifying the specific person of the stored information.

In other words, in the present exemplary embodiment, in a case where the user selects the non-permission selection item 192 (refer to FIG. 7) for giving an instruction for not providing a notification, the CPU 511 of the server apparatus 50 does not perform a process of notifying a notification destination correlated with the shared folder 210 of the stored information.

In other words, in the present exemplary embodiment, in a case where there is no setting to notify another user who is a recipient that the server apparatus 50 has received the document file 220, the other user is not notified.

In a case where another user who is a notification destination of the stored information has not started an application for referencing the document file 220 stored in the shared folder 210, the other user cannot know that the document file 220 has been stored in the shared folder 210.

On the other hand, in the present exemplary embodiment, a notification is provided by e-mail, and thus the notification is provided without using the application for referencing the document file 220 stored in the shared folder 210.

In this case, even in a case where the application is not started, the other user will know that the document file 220 has been stored in the shared folder 210.

In other words, in this case, even in a case where the application is not started, the other user will know that the server apparatus 50 has received the document file 220.

The notification via the application is not excluded, and the notification that the document file 220 has been stored in the shared folder 210 may be provided via the application.

Both a notification in a method without using the application such as a notification by an e-mail and a notification via the application may be performed.

The notification in the method without using the application is not limited to an e-mail, and other notifications using a social networking service (SNS) or the like may be employed.

In the present exemplary embodiment, a sender of the document file 220 may set whether or not to notify a recipient that the server apparatus 50 has received the document file 220.

Here, the sender of the document file 220 may want to set whether or not to notify the recipient. Specifically, for example, in a case of transmitting a document file 220 that the recipient wants to check in a hurry, the sender may want to notify the recipient that the document file 220 has been received.

In this case, in the present exemplary embodiment, in a case where the sender performs a setting to notify the recipient that the document file 220 has been received, the recipient is notified that the file has been received.

In the present exemplary embodiment, each time the user moves the document file 220 to the shared folder 210 and stores the document file 220 in the information storage device 502, a process of accepting a setting of whether or not a specific person is notified of the stored information from the user is performed.

In the present exemplary embodiment, a setting of whether or not to notify a specific person of the stored information is performed for each document file 220 stored in the information storage device 502.

In other words, in the present exemplary embodiment, each time the user performs an operation of storing the document file 220 in the information storage device 502, a setting of whether or not to notify a specific person of the stored information of the document file 220 is performed.

In the present exemplary embodiment, the setting of whether or not to notify a specific person of the stored information is accepted from the user in a case where the user stores the document file 220 in the shared folder 210, not at the time of an initial setting of the application.

In other words, in the present exemplary embodiment, in a case where a sender transmits the document file 220, the setting of whether or not to notify another user who is a recipient that the server apparatus 50 has received the document file 220 is accepted from the sender.

In the present exemplary embodiment, each time the sender transmits the document file 220, the sender may perform a setting of whether to notify that the document file 220 has been received.

For example, the setting of whether or not to notify a specific person of the stored information may be performed as an initial setting of the application.

On the other hand, in the present exemplary embodiment, in a case where the user stores the document file 220 in the information storage device 502 not at the time of this initial setting, the setting of whether or not to notify a specific person of the stored information for each document file 220 is accepted.

In the present exemplary embodiment, after the user performs the start operation, the setting of whether or not to provide a notification is accepted from the user.

More specifically, in the present exemplary embodiment, after the user drops the document file 220 into the shared folder 210, the setting of whether or not to report the stored information is accepted from the user.

In other words, in the present exemplary embodiment, after the user drops the document file 220 into the shared folder 210, the setting whether or not to notify a recipient that the server apparatus 50 has received the document file 220 is accepted from a sender.

Figure 8:
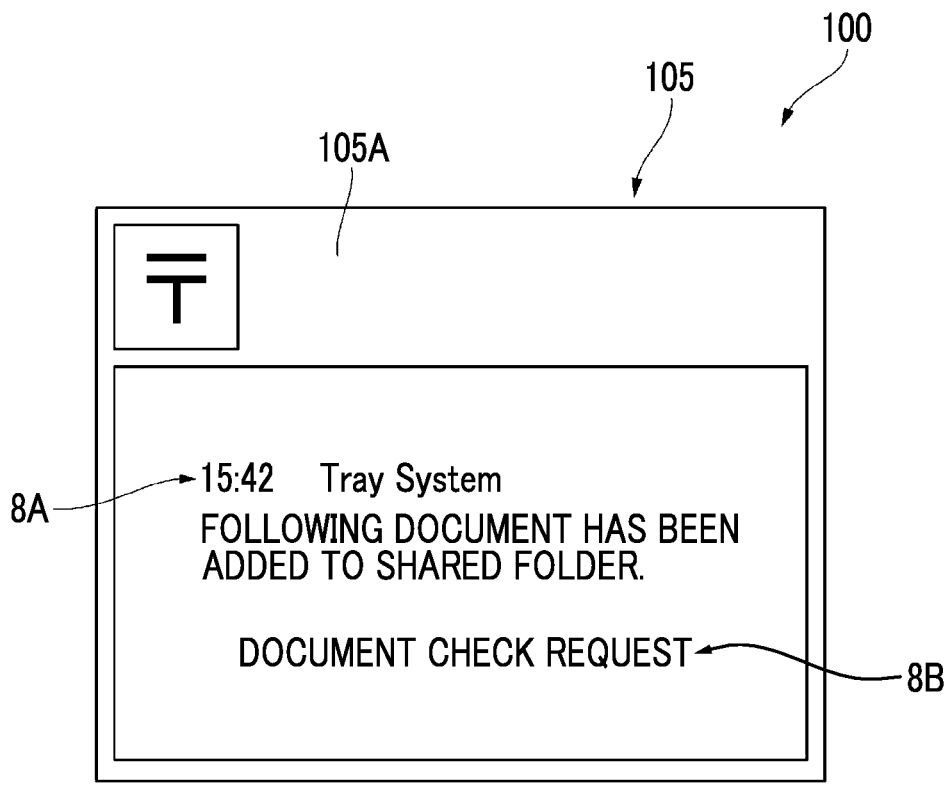
FIG. 8 is a diagram showing a display screen displayed on a terminal apparatus of another user notified of stored information.

FIG. 8 is a diagram showing the display screen 105A displayed on the terminal apparatus 100 of another user notified of the stored information.

In other words, FIG. 8 is a diagram showing the display screen 105A displayed on the terminal apparatus 100 of another user notified that the server apparatus 50 has received the document file 220.

In other words, FIG. 8 is a diagram showing the display screen 105A displayed on the terminal apparatus 100 of another user notified that the shared folder 210 has received the document file 220.

In a case where there is a setting to report the stored information, when the document file 220 is stored in the information storage device 502, a process of reporting the stored information by an e-mail or the like is performed as described above.

Consequently, as shown in FIG. 8, display indicating that the new document file 220 is stored in the shared folder 210 is performed on the display screen 105A of the terminal apparatus 100 of another user. In other words, a notification that the server apparatus 50 has received the document file 220 is provided on the display screen 105A.

On the display screen 105A, information regarding the time at which the document file 220 is stored is displayed as indicated by the reference numeral 8A, and the name of the stored document file 220 is displayed as indicated by the reference numeral 8B.

In the present exemplary embodiment, the case where the stored information notification process is performed in a case where the document file 220 is stored in the information storage device 502 has been described as an example, but this process is an example.

A file does not have to be stored, and the details of the present exemplary embodiment may be applied to a process in which, in a case where a file is received by the server apparatus 50 regardless of whether or not the file is stored, information regarding this reception is reported to a predefined recipient.

Figure 9:
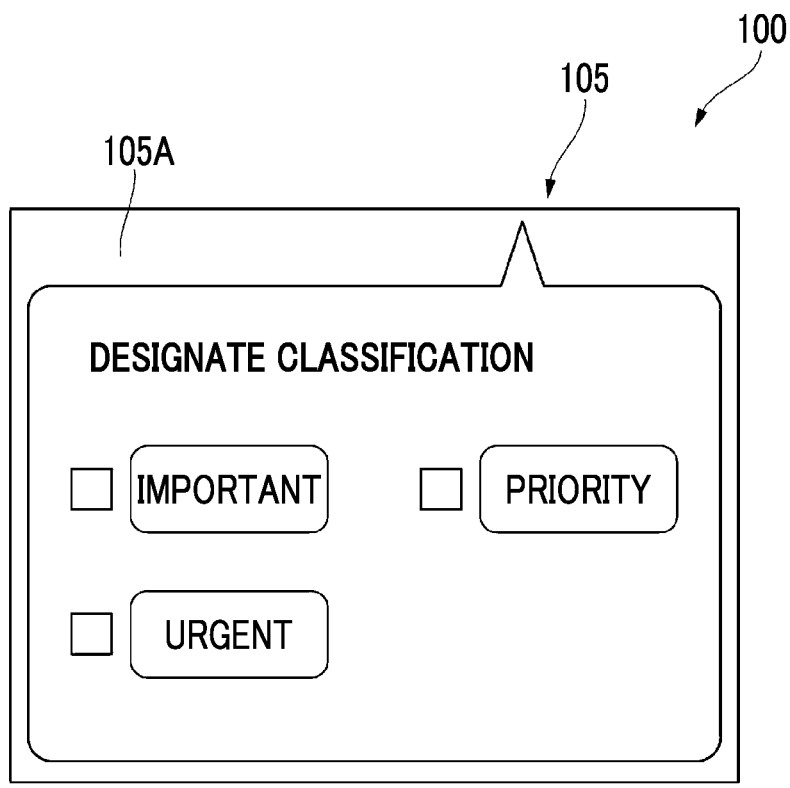
FIG. 9 is a diagram showing a display screen of the terminal apparatus of the user in a case where the user selects a second selection item for designating a classification.

FIG. 9 is a diagram showing the display screen 105A of the terminal apparatus 100 of the user in a case where the user selects the second selection item 612 (refer to FIG. 6) for designating a classification.

A list of classifications is displayed on the display screen 105A. In other words, the display screen 105A displays information regarding a plurality of classifications. Although not shown, the display screen 105A displays a back button that is a button for returning to the acceptance screen 198 (refer to FIG. 6).

On the display screen 105A, three classifications such as "important", "priority", and "urgent" are displayed as the information regarding a classification.

Here, each of these three classifications indicates the priority and/or the importance of the document file 220.

In the present exemplary embodiment, the terminal apparatus 100 of the user who transmits the document file 220 accepts information regarding the priority and/or the importance of the document file 220.

In the present exemplary embodiment, in a case where the user selects one or more classifications from these classifications and selects the determination button 79 (refer to FIG. 6), the above document file 220 for which the start operation is performed is correlated with information regarding the classification.

The document file 220 and the classification information are transmitted to the server apparatus 50 in a state of being correlated with each other. The server apparatus 50 acquires the document file 220 and the classification information, and then stores the document file 220 and the classification information in the information storage device 502 (refer to FIG. 2) in a state of being correlated with each other.

In the present exemplary embodiment, in a case where another user refers to the shared folder 210, the information regarding the document file 220 and the classification information correlated with the document file 220 are displayed on the display screen 105A of the terminal apparatus 100 of the other user in a state of being correlated with each other (that will be described later).

Although not shown, in the present exemplary embodiment, in a case where the third selection item 613 (refer to FIG. 6) for inputting a message is selected by the user, a message input field is displayed on the display screen 105A of the terminal apparatus 100 of the user.

Although not shown, the display screen 105A displays a back button that is a button for returning to the acceptance screen 198 (refer to FIG. 6).

The user inputs a message in the input field and selects the determination button 79 (refer to FIG. 6).

In this case, this message is correlated with the above document file 220 for which the start operation has been performed. In other words, the input information that is input by the user is correlated with the above document file 220 that has performed the start operation.

The document file 220 and the input information are transmitted to the server apparatus 50 in a state of being correlated with each other.

The CPU 511 of the server apparatus 50 receives the document file 220 and the input information, and then stores the document file 220 and the input information in the information storage device 502 in a state of being correlated with each other.

In the present exemplary embodiment, in a case where another user refers to the shared folder 210, the information regarding the document file 220 and the input information correlated with the document file 220 are displayed on the display screen 105A of the terminal apparatus 100 of the other user in a state of being correlated with each other (described later).

In the present exemplary embodiment, in a case where the user selects the fourth selection item 614 (refer to FIG. 6) for giving an instruction for starting a transmission process and further selects the determination button 79, the document file 220 is transmitted from the terminal apparatus 100 to the server apparatus 50 without waiting for the elapse of the above predefined time.

In the present exemplary embodiment, in a case where the user selects the fifth selection item 615 (refer to FIG. 6) for stopping the transmission process and further selects the determination button 79, the transmission of the document file 220 from the terminal apparatus 100 to the server apparatus 50 is stopped.

After the acceptance screen 198 (refer to FIG. 6) is displayed, the user may notice an error in the document file 220, an error in the shared folder 210 as the transmission destination, or the like. In this case, the user selects the fifth selection item 615 and stops the transmission of the document file 220.

In the above description, the case where the user selects one selection item 600 from the first selection item 611 to the fifth selection item 615 and then selects the determination button 79 has been described.

However, the present exemplary embodiment is not limited to this, and two or more selection items 600 may be selected from the first selection item 611 to the fifth selection item 615.

In a case where the user selects two or more selection items 600, the document file 220 is transmitted from the terminal apparatus 100 to the server apparatus 50 after the user performs settings for the plurality of selection items 600.

Specifically, in the present exemplary embodiment, a "back button" (not shown) is displayed on each display screen 105A after selecting the selection item 600, such as the display screen 105A shown in FIGS. 7 and 9.

In the present exemplary embodiment, the acceptance screen 198 is displayed again by selecting the back button. The user performs an operation on the acceptance screen 198 and selects another selection item 600.

Consequently, in the present exemplary embodiment, the user perform settings for a plurality of selection items 600.

Figure 10:
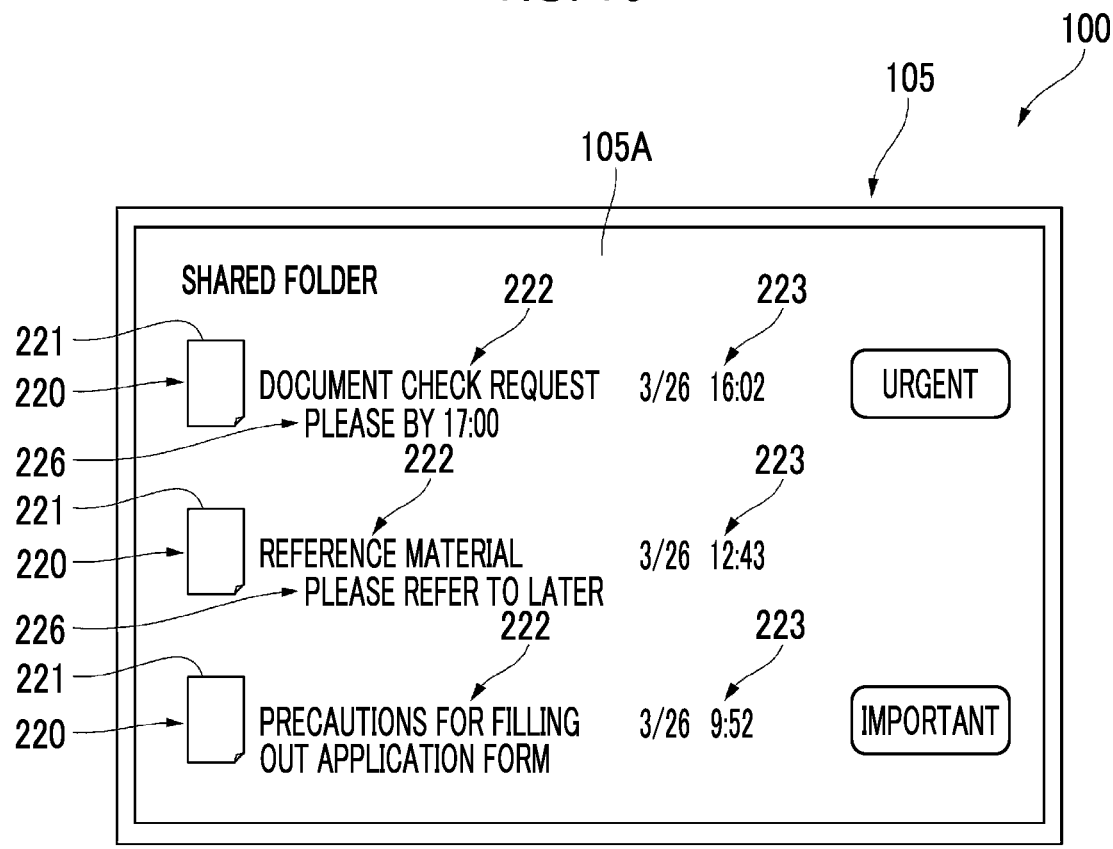
FIG. 10 is a diagram showing an example of a display screen of the terminal apparatus of another user.

FIG. 10 is a diagram showing an example of the display screen 105A of the terminal apparatus 100 of another user who refers to the document file 220 stored in the shared folder 210.

The display screen 105A shown in FIG. 10 is the display screen 105A in a case where another user who has been notified of the stored information refers to the shared folder 210 via the application.

In other words, the display screen 105A shown in FIG. 10 is the display screen 105A in a case where the other user who has been notified that the server apparatus 50 has received the document file 220 refers to the shared folder 210 via the application.

Display indicating that three document files 220 are stored in the shared folder 210 is performed on the display screen 105A. In other words, display indicating that the three document files 220 are stored in the information storage device 502 is performed.

A document file image 221 that is an image representing the document file 220, a document file name 222, and the date and time 223 at which the document file 220 is stored in the shared folder 210 are displayed on the display screen 105A in correspondence to each of the document files 220.

In this example, the first document file 220 displayed at the top is correlated with the classification "urgent", and text information "urgent" is displayed on the display screen 105A in a state of being correlated with the first document file 220.

In other words, in this example, information regarding the processing priority is correlated with the first document file 220, and the information regarding the processing priority is displayed for the first document file 220.

In this example, the input information 226 "please by 17:00" is correlated with the first document file 220.

Consequently, the input information 226 "please by 17:00" is displayed on the display screen 105A shown in FIG. 10 in a state of being correlated with the first document file 220.

In other words, the text information "please by 17:00" that is the input information 226 input by the user is displayed on the display screen 105A shown in FIG. 10 in a state of being correlated with the first document file 220.

In this example, the input information 226 "please refer to later" is correlated with the second document file 220.

Consequently, the input information 226 "please refer to later" is displayed on the display screen 105A shown in FIG. 10 in a state of being correlated with the second document file 220.

In other words, the text information "please refer to later" that is the input information 226 input by the user is displayed on the display screen 105A shown in FIG. 10 in a state of being correlated with the second document file 220.

In this example, the classification "important" is correlated with the third document file 220.

Consequently, the text information "important" is displayed on the display screen 105A shown in FIG. 10 in a state of being correlated with the third document file 220.

In other words, in this example, the third document file 220 is correlated with information regarding the importance of the document file 220.

Consequently, in the present exemplary embodiment, the information regarding the importance of the document file 220 is displayed on the display screen 105A in a state of being correlated with the third document file 220.

In the present exemplary embodiment, as described above, the terminal apparatus 100 of the user who transmits the document file 220 accepts the information regarding the priority and/or the importance of the document file 220.

In the present exemplary embodiment, the information regarding the priority and/or the importance is stored in the information storage device 502 of the server apparatus 50 in a state of being correlated with the document file 220.

In a case where the CPU 511 of the server apparatus 50 transmits the information regarding the document file 220 to the terminal apparatus 100 of another user, the CPU 511 also transmits the information regarding the priority and/or the importance correlated with the document file 220 to the terminal apparatus 100 of the other user.

In the present exemplary embodiment, as described above, the terminal apparatus 100 of the user who transmits the document file 220 accepts the input information 226.

In the present exemplary embodiment, the input information 226 is stored in the information storage device 502 of the server apparatus 50 in a state of being correlated with the document file 220.

In a case where the CPU 511 of the server apparatus 50 transmits the information regarding the document file 220 to the terminal apparatus 100 of another user, the input information 226 correlated with the document file 220 is also transmitted to the terminal apparatus 100 of the other user.

Here, a description has been made of an example of a case where, when another user who is an example of a recipient refers to the shared folder 210, the other user is notified of the information regarding the priority and/or the importance or the input information 226.

However, the present exemplary embodiment is not limited to this, and the information regarding the priority and/or the importance or the input information 226 may be displayed on the display screen 105A shown in FIG. 8.

In other words, the information regarding the priority and/or the importance or the input information 226 may be reported to the other user via the display screen 105A shown in FIG. 8.

The display screen 105A shown in FIG. 8 is the display screen 105A displayed in a case where the server apparatus 50 notifies another user who is a recipient that the document file 220 has been received, but the information regarding the priority and/or the importance or the input information 226 may be displayed on the display screen 105A.

In other words, in a case where the recipient is notified of reception of the document file 220, the recipient may be notified of the information regarding the priority and/or the importance or the input information 226.

Figure 11:
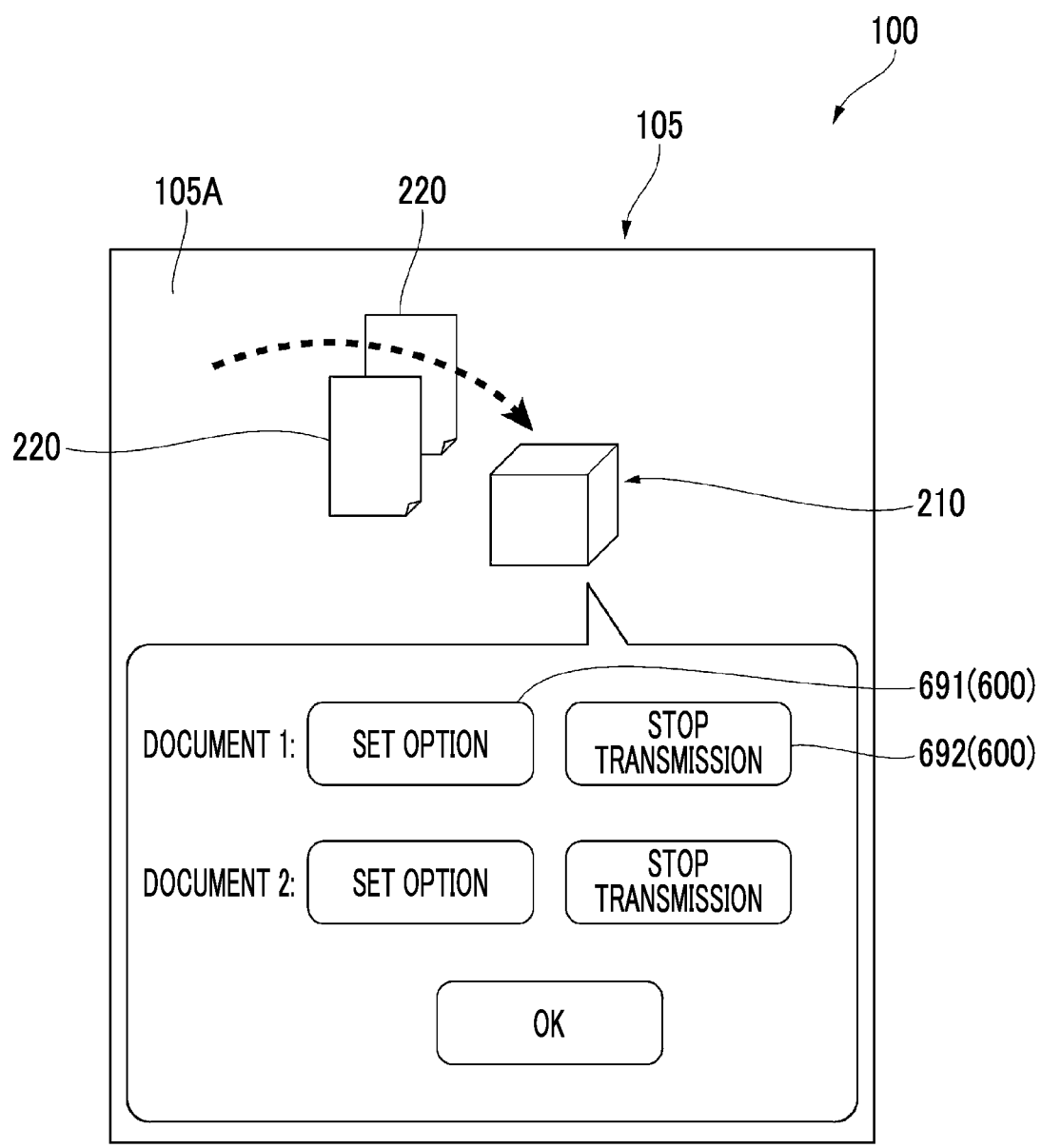
FIG. 11 shows another display example on the display screen of the terminal apparatus.

FIG. 11 shows another display example on the display screen 105A of the terminal apparatus 100.

In the present exemplary embodiment, a user may move a plurality of document files 220 together to the shared folder 210. More specifically, in this case, the user selects, for example, a plurality of document files 220, and then moves the plurality of document files 220 together to the shared folder 210.

In other words, in this case, the user drags the plurality of document files 220, moves the plurality of document files 220 to the shared folder 210, and then drops the plurality of document files 220.

In this case, in the present exemplary embodiment, as shown in FIG. 11, a selection item 691 for setting and a selection item 692 for stopping transmission are displayed for each document file 220.

Although not shown, in a case where the user selects the selection item 691 for setting, the three selection items 600 such as "set notification", "set classification", and "input message", and the back button are displayed.

In this case, as described above, the user performs an operation on each selection item 600 to perform various settings.

In the present exemplary embodiment, in a case where a plurality of document files 220 are stored in the shared folder 210, it is possible to perform a setting of whether or not to report the stored information for each document file 220.

In other words, in the present exemplary embodiment, in a case where a plurality of document files 220 are transmitted, it is possible to perform a setting of whether or not to notify that the server apparatus 50 has received the document file 220 for each document file 220.

In the present exemplary embodiment, in a case where a plurality of document files 220 are stored in the shared folder 210, a classification may be designated for each document file 220. In the present exemplary embodiment, in a case where a plurality of document files 220 are stored in the shared folder 210, the input information 226 may be input for each document file 220. In the present exemplary embodiment, in a case where a plurality of document files 220 are stored in the shared folder 210, transmission may be stopped for each document file 220.

In the example shown in FIG. 11, two selection items 600 are displayed for each document file 220, but the present exemplary embodiment is not limited to this, and for example, three selection items 600 such as "set option", "stop transmission", and "transmit" may be displayed for each document file 220.

In this case, in a case where "set option" is selected, the three selection items 600 such as "set notification", "set classification", and "input message", and the back button are displayed.

For example, in the same manner as in the acceptance screen 198 shown in FIG. 6, five selection items 600 such as "set notification", "designate classification", "input message", "transmit", and "stop" may be displayed for each document file 220.

In a case where the user selects a plurality of document files 220, as described above, each of the plurality of document files 220 may be selected in order and moved to the shared folder 210 instead of the batch selection.

In this case, for example, each time a new document file 220 is selected, a predefined addition time is added to the above predefined time.

More specifically, each time the new document file 220 is selected, the addition time is added to the predefined time, and a time after the addition is set as a new predefined time.

In a case where the shared folder 210 is tapped by the user within the predefined time after the addition time is added (hereinafter, "time after the addition"), the acceptance screen 198 shown in FIG. 6 or the display screen 105A shown in FIG. 11 is displayed.

In a case where the shared folder 210 is not tapped by the user by the time after the addition, the acceptance screen 198 shown in FIG. 6 or the display screen 105A shown in FIG. 11 is not displayed and the transmission process is resumed.

Figure 12:
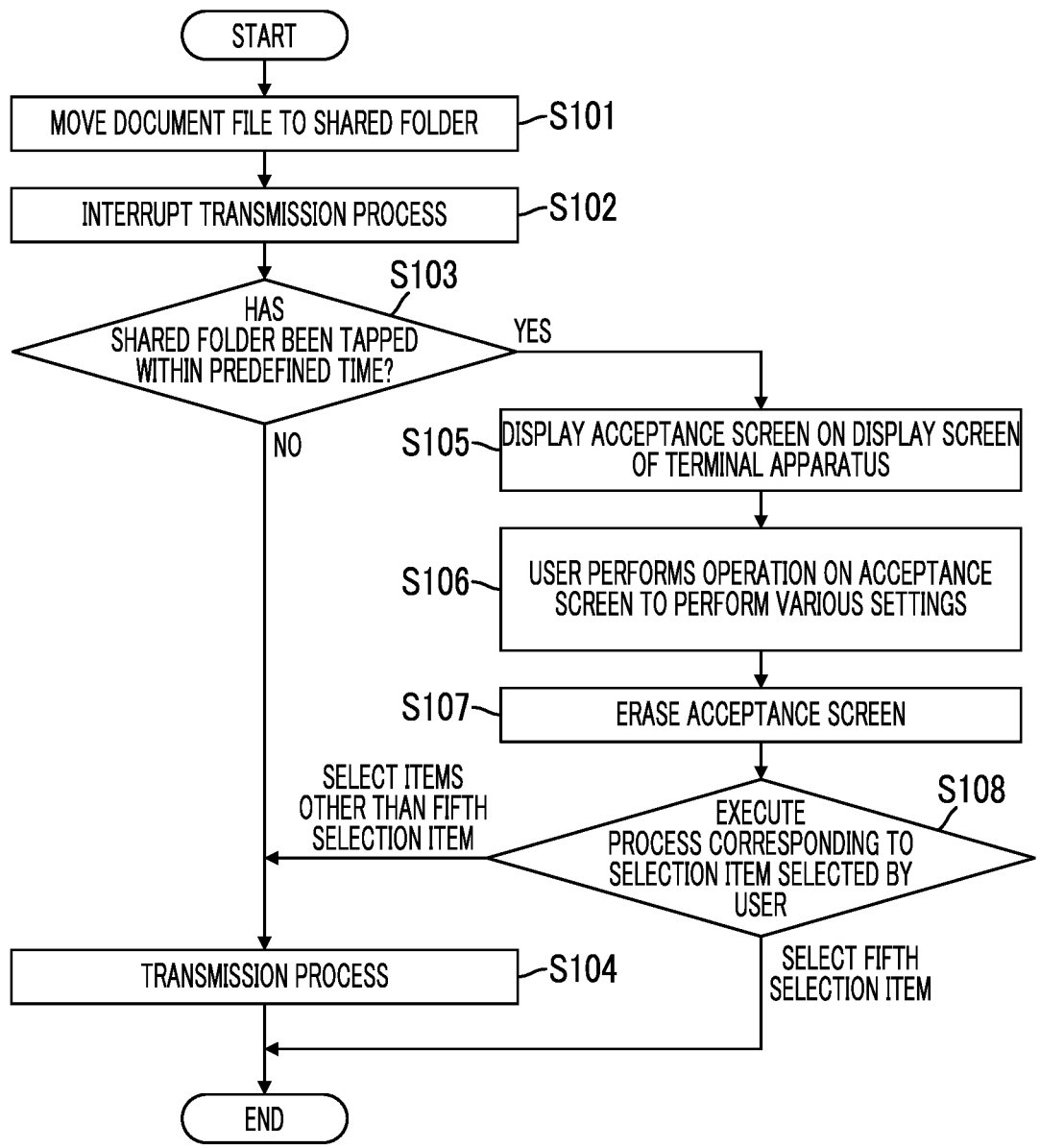
FIG. 12 is a flowchart showing a process flow.

FIG. 12 is a flowchart showing a flow of the processes described above.

In the present exemplary embodiment, first, as described above, the user operates his/her own terminal apparatus 100 to move the document file 220 to the shared folder 210 (step S101).

In this case, the CPU 111 of the terminal apparatus 100 does not immediately perform the transmission process for the document file 220 to the server apparatus 50, but interrupts the transmission process (step S102).

Next, the CPU 111 of the terminal apparatus 100 determines whether or not the shared folder 210 has been tapped within a predefined time after the document file 220 is moved to the shared folder 210 (step S103).

In other words, the CPU 111 of the terminal apparatus 100 determines whether or not a specific operation has been performed by the user within the predefined time after the document file 220 is moved to the shared folder 210.

The CPU 111 of the terminal apparatus 100 performs a transmission process in a case where there is no tapping within a predefined time (step S104).

Specifically, in this case, the CPU 111 of the terminal apparatus 100 performs the transmission process for the document file 220. In other words, in this case, the CPU 111 of the terminal apparatus 100 resumes the transmission process for the document file 220.

On the other hand, in a case where the CPU 111 of the terminal apparatus 100 determines in step S103 that the tapping has been performed within a predefined time, the CPU 111 continues to interrupt the transmission process for the document file 220 to the server apparatus 50.

In a case where the CPU 111 of the terminal apparatus 100 determines that the tapping has been performed within the predefined time, the acceptance screen 198 shown in FIG. 6 is displayed on the display device 105 of the terminal apparatus 100 (step S105).

In this case, the user performs an operation on the acceptance screen 198 and performs various settings described above (step S106).

Specifically, the user selects the selection item 600 shown above and performs various settings.

The user selects the selection item 600, and then selects the determination button 79 (refer to FIG. 6).

In a case where the user selects the determination button 79, the CPU 111 of the terminal apparatus 100 erases the acceptance screen 198 (step S107).

Next, the CPU 111 of the terminal apparatus 100 executes a process corresponding to the selection item 600 selected by the user (step S108).

Specifically, the CPU 111 of the terminal apparatus 100 does not perform the transmission process for the document file 220 and finishes the process, for example, in a case where the user selects the fifth selection item 615 (refer to FIG. 6) and then selects the determination button 79.

In a case where the user selects the fourth selection item 614 (refer to FIG. 6) and then selects the determination button 79, the CPU 111 of the terminal apparatus 100 proceeds to the process in step S104 and performs the transmission process.

Specifically, the CPU 111 of the terminal apparatus 100 performs the transmission process for the document file 220. In other words, the CPU 111 of the terminal apparatus 100 resumes the transmission process for the document file 220.

In a case where the user selects the first selection item 611 (refer to FIG. 6) and then selects the determination button 79, the CPU 111 of the terminal apparatus 100 displays the display screen 105A shown in FIG. 7, and accepts a setting whether or not to transmit the stored information from the user.

The CPU 111 of the terminal apparatus 100 correlates the document file 220 with the setting information, and then transmits the document file 220 and the setting information to the server apparatus 50 (step S104). In other words, also in this case, the CPU 111 of the terminal apparatus 100 resumes the transmission process for the document file 220.

In a case where the user selects the second selection item 612 (refer to FIG. 6) and then selects the determination button 79, the CPU 111 of the terminal apparatus 100 displays the display screen 105A shown in FIG. 9 and accepts classification information from the user.

The CPU 111 of the terminal apparatus 100 correlates the document file 220 with the classification information, and then transmits the document file 220 and the classification information to the server apparatus 50 (step S104). In other words, also in this case, the CPU 111 of the terminal apparatus 100 resumes the transmission process for the document file 220.

In a case where the user selects the third selection item 613 (refer to FIG. 6) and then selects the determination button 79, the CPU 111 of the terminal apparatus 100 displays a display screen (not shown) for accepting input information and accepts input information from the user.

The CPU 111 of the terminal apparatus 100 correlates the document file 220 with the input information, and then transmits the document file 220 and the input information to the server apparatus 50 (step S104). In other words, also in this case, the CPU 111 of the terminal apparatus 100 resumes the transmission process for the document file 220.

As described above, in the present exemplary embodiment, in a case where the back button is selected as described above, the acceptance screen 198 (refer to FIG. 6) is displayed again, and thus in the present exemplary embodiment, the user may perform settings for a plurality of selection items 600.

In a case where the user performs settings for the plurality of selection items 600, in step S104, in addition to the document file 220, two or more of the setting information, the classification information, and the input information 226 are transmitted to the server apparatus 50.

After that, in the present exemplary embodiment, the process is performed by the server apparatus 50.

In a case where the document file 220 is transmitted from the terminal apparatus 100, the CPU 511 of the server apparatus 50 stores the document file 220 in the information storage device 502 of the server apparatus 50.

In a case where the setting information indicating a setting to report the stored information is transmitted together with the document file 220 transmitted from the terminal apparatus 100, the CPU 511 of the server apparatus 50 transmits performs a process of notifying a predefined notification destination of the stored information.

In other words, in a case where the setting information correlated with the document file 220 transmitted from the terminal apparatus 100 indicates the setting to report the stored information, the CPU 511 of the server apparatus 50 performs the process of notifying the predefined notification destination of the stored information.

In other words, in a case where the setting information correlated with the document file 220 transmitted from the terminal apparatus 100 indicates a setting to report reception, the CPU 511 of the server apparatus 50 performs a process of notifying a recipient of the stored information.

On the other hand, in a case where the setting information correlated with the document file 220 transmitted from the terminal apparatus 100 indicates a setting not to report the stored information, the CPU 511 of the server apparatus 50 does not perform the process of notifying the predefined notification destination of the stored information.

In other words, in a case where the setting information correlated with the document file 220 transmitted from the terminal apparatus 100 indicates a setting not to report reception, the CPU 511 of the server apparatus 50 does not perform a process of notifying a recipient of the stored information.

In a case where the classification information or the input information 226 is correlated with the document file 220 transmitted from the terminal apparatus 100, the CPU 511 of the server apparatus 50 stores the document file 220 and the classification information or the input information 226 in the information storage device 502 in a state of being correlated with each other.

Consequently, in the present exemplary embodiment, in a case where another user refers to the shared folder 210, as shown in FIG. 10, the classification information or the input information 226 correlated with the document file 220 is displayed on the terminal apparatus 100 of the other user.

In the present exemplary embodiment, in a case where the shared folder 210 is not tapped within the above predefined time after the document file 220 is moved to the shared folder 210, the CPU 111 of the server apparatus 50 performs a process related to transmission of the stored information according to a default setting.

Similarly, in the present exemplary embodiment, even in a case where the shared folder 210 is tapped, when the user does not select the first selection item 611, the CPU 511 of the server apparatus 50 performs a process related to transmission of the stored information according to the default setting.

Specifically, in a case where the default setting is to transmit the stored information, the CPU 511 of the server apparatus 50 transmits the stored information to a predefined notification destination.

In a case where the default setting is not to transmit the stored information, the CPU 511 of the server apparatus 50 does not transmit the stored information to a predefined notification destination.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a processor configured to:
   accept, from a sender of a file, a setting of whether or not to notify a recipient that the file has been received; and
   notify the recipient that the file has been received in a case where there is a reception setting to notify that the file has been received.

2. The information processing system according to claim 1, wherein the processor is configured not to:
   notify the recipient that the file has been received in a case where there is no reception setting to notify that the file has been received.

3. The information processing system according to claim 1,
   wherein the setting of whether or not to notify the recipient that the file has been received is accepted for each file.

4. The information processing system according to claim 1,
   wherein, in a case where the sender transmits the file, the setting of whether or not to notify is accepted from the sender.

5. The information processing system according to claim 1,
   wherein, after an operation of moving the file to a specific region is performed, the setting of whether or not to notify is accepted from the sender.

6. The information processing system according to claim 5,
   wherein, in a case where the sender performs the operation of moving the file to the specific region and then further performs a reception operation, a process of accepting the setting of whether or not to notify from the sender is performed.

7. The information processing system according to claim 6, wherein, in a case where the sender performs the operation of moving the file to the specific region and then performs the reception operation within a predefined time, the process of accepting the setting of whether or not to notify from the sender is performed.

8. The information processing system according to claim 7, wherein the file transmitted by the sender is stored in a file storage unit, and
a storage process for the file in the file storage unit is interrupted until the predefined time elapses after the sender performs the operation of moving the file to the specific region.

9. The information processing system according to claim 8, wherein, in a case where the sender does not perform the reception operation within the predefined time, the storage process is resumed.

10. The information processing system according to claim 1, wherein the processor is configured to:
in a case where there is input information that is information input by the sender, notify the recipient of the input information when the processor notifies the recipient of reception of the file.

11. The information processing system according to claim 1, wherein the processor is configured to:
accept information regarding priority and/or importance of the file from the sender, and
in a case where the processor notifies the recipient of reception of the file, notify the recipient of the information regarding the priority and/or the importance.

12. The information processing system according to claim 1, wherein the information processing system is configured to:
in a case where a plurality of files are transmitted, perform the setting of whether or not to notify for each file.

13. A non-transitory computer readable medium storing a program causing a computer to realize:
a function of accepting, from a sender of a file, a setting of whether or not to notify a recipient that the file has been received; and
a function of notifying the recipient that the file has been received in a case where there is a reception setting to notify that the file has been received.

14. An information processing method comprising:
accepting, from a sender of a file, a setting of whether or not to notify a recipient that the file has been received; and
notifying the recipient that the file has been received in a case where there is a reception setting to notify that the file has been received.

* * * * *